H. H. YOUNG.
SIDE CAR WHEEL FOR MOTOR CYCLES.
APPLICATION FILED DEC. 26, 1913.
1,204,924.
Patented Nov. 14, 1916.
3 SHEETS—SHEET 1.
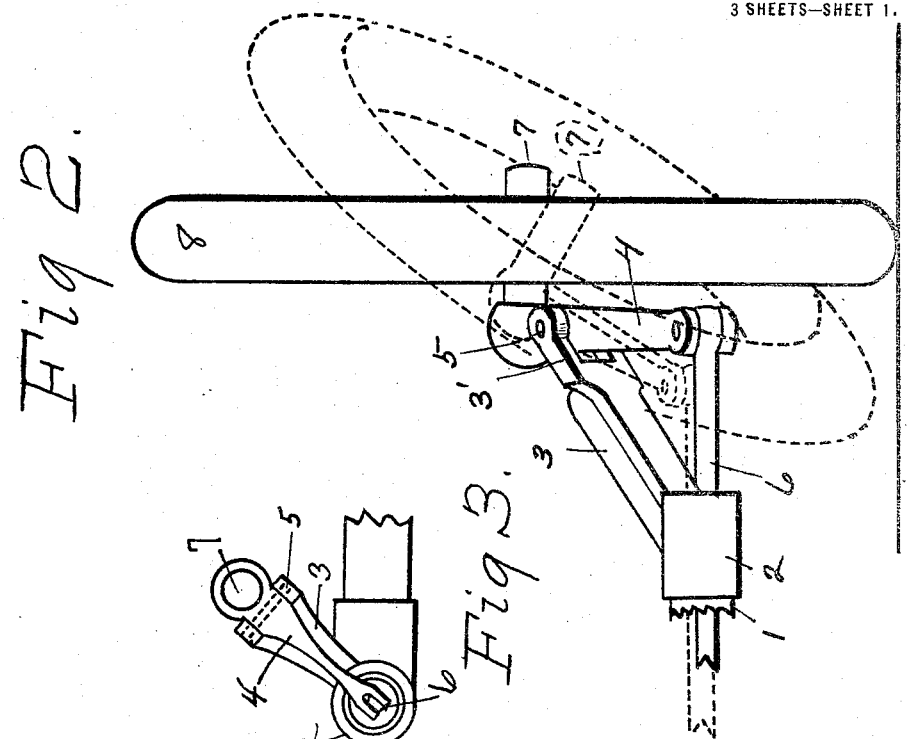
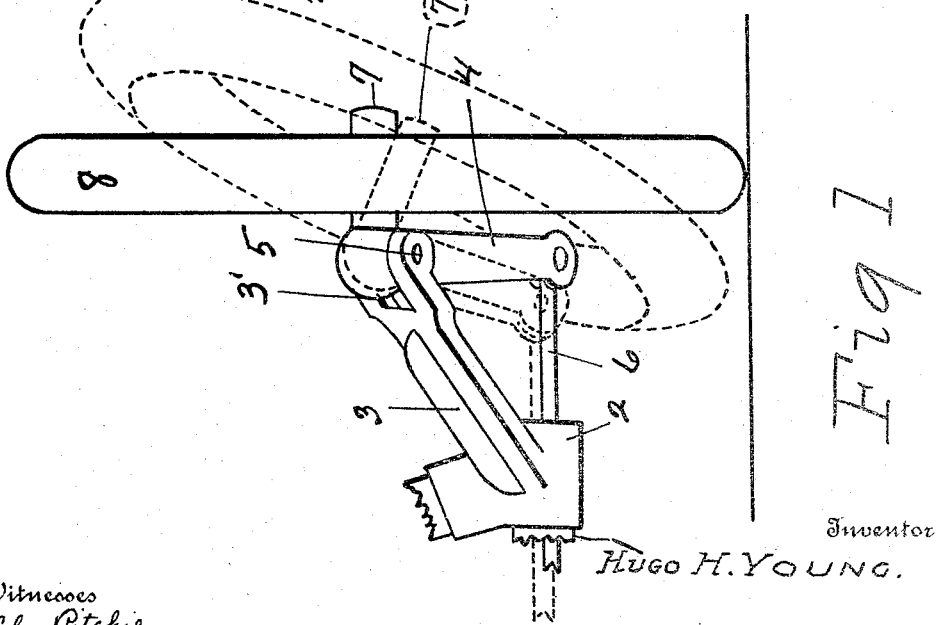
Inventor
HUGO H. YOUNG.
Witnesses

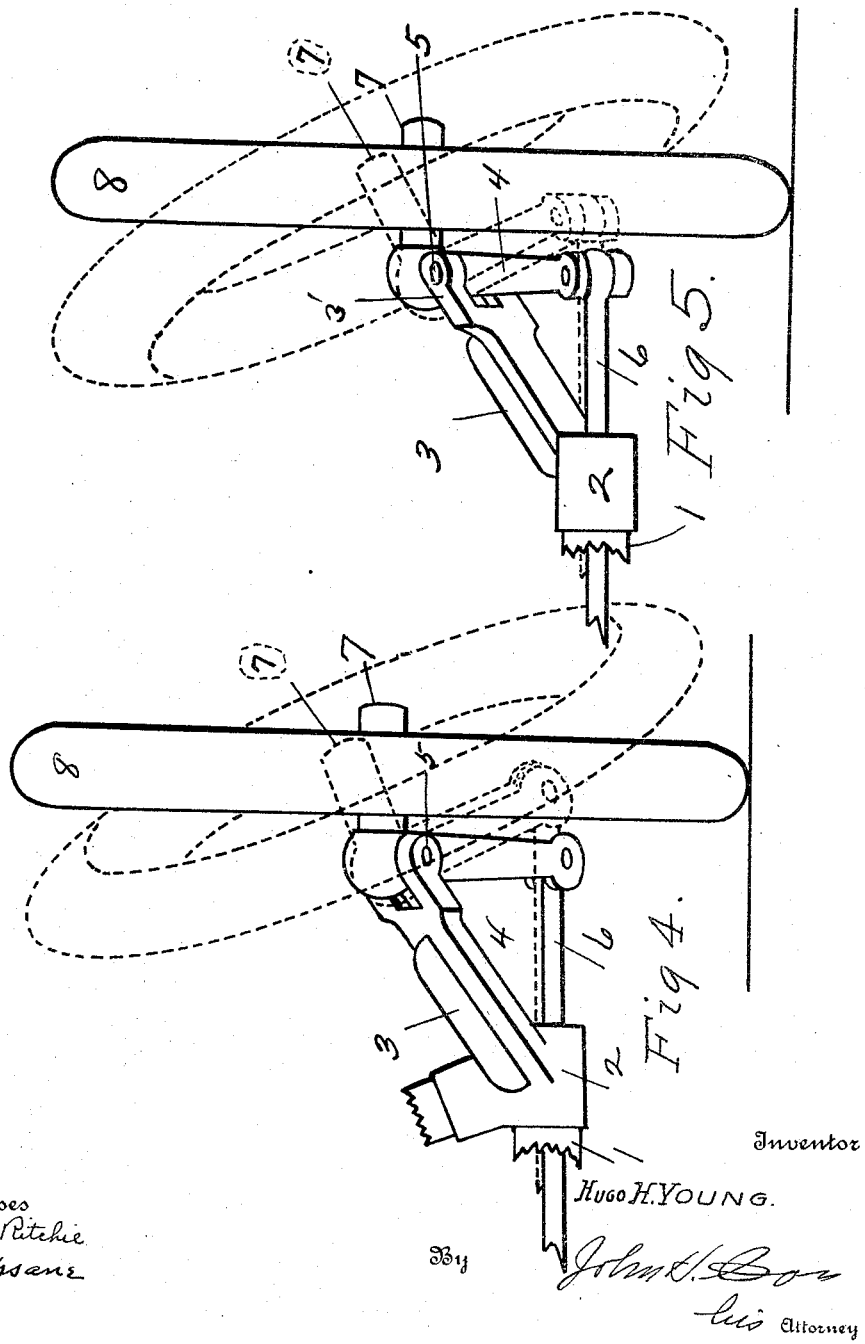

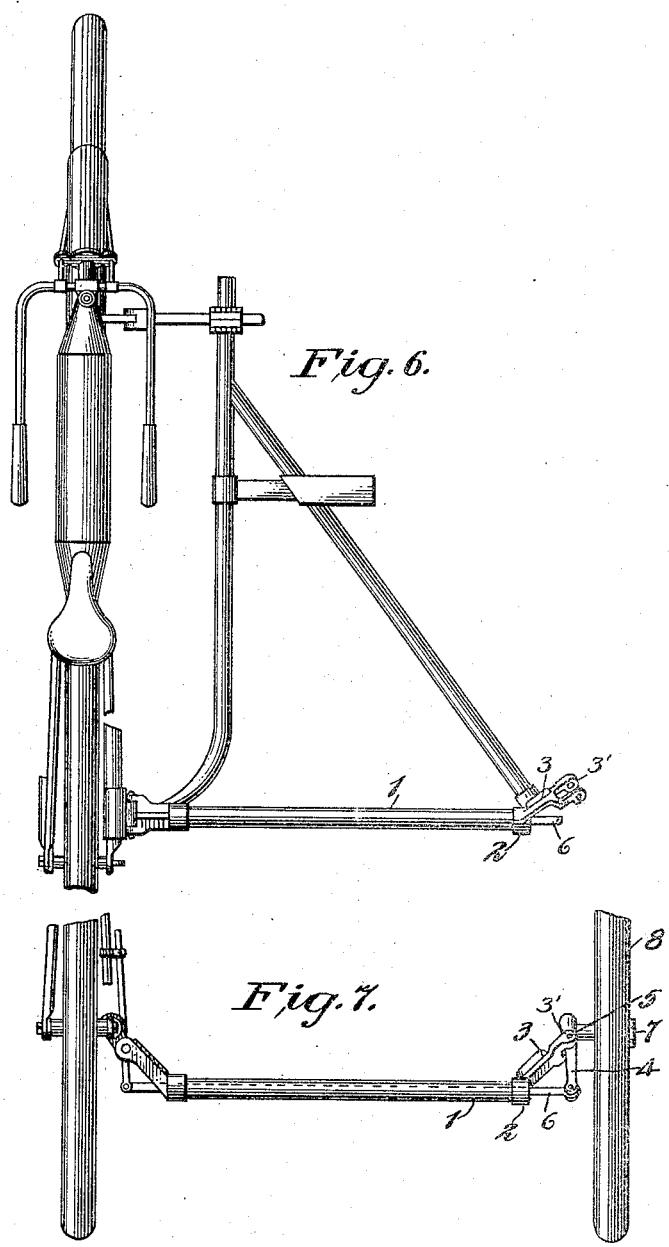

UNITED STATES PATENT OFFICE.

HUGO H. YOUNG, OF MANSFIELD, OHIO.

SIDE-CAR WHEEL FOR MOTOR-CYCLES.

1,204,924.

Specification of Letters Patent.   Patented Nov. 14, 1916.

Application filed December 26, 1913.   Serial No. 808,678.

*To all whom it may concern:*

Be it known that I, HUGO H. YOUNG, a citizen of the United States of America, residing at Mansfield, in the county of Richland and State of Ohio, have invented certain new and useful Improvements in Side-Car Wheels for Motor-Cycles, of which the following is a specification.

This invention relates to certain new and useful improvements in side cars for motorcycles, and relates more particularly to the mounting for the wheel of the side car.

In deviating from a straight line of travel and making a turn with a motor cycle, or the like, the wheel that supports the side car skids in making the turn and imparts a severe strain through the frame of the side car to the motor cycle frame, and in addition also causes a side pull, with resultant injurious effects to the entire structure.

It is therefore the primary object of this invention to provide a wheel mounting which allows the side car wheel to tilt or cant to a degree corresponding to the movement of the front wheel of the motor cycle and at the same time to move in an oblique direction corresponding to that which the front motor cycle wheel assumes in making turns.

In the drawings: Figure 1 is a top plan view of the invention, showing the wheel tilted as in turning to the right in dotted lines; Fig. 2 is a rear elevation of Fig. 1; Fig. 3 is a front end elevation of the invention; Fig. 4 is a view similar to Fig. 1 showing the wheel tilted as in turning to the left in dotted lines; and Fig. 5 is a rear elevation of Fig. 4. Fig. 6 is a plan view showing my invention applied to the frame of a side car which is in turn attached to a motor cycle. Fig. 7 is a rear view of Fig. 6.

In the drawings the tubular bar 1, forming a part of the frame of the side car is shown. A bracket 2 is secured to the bar 1 and has an inclined arm 3 rigidly secured thereto, the arm 3 having a forked free end 3'. A rocker arm 4 has a part thereof disposed in said forked end 3' and is pivoted to a pin 5 that is secured to the forked end 3'. The lower end of the rocker arm 4 is pivoted to one end of a bar or rod 6, which slides through the tubular bar 1 of the side car frame, which bar or rod 6 may be operated in any desired manner by the movements of the motor cycle. The rocker arm has rigidly secured thereto an axle 7 on which the side car wheel 8 is mounted, the axle 7 being at right angles to the pivot pin 5.

It will be noted that the arm 3 is inclined forwardly of the frame bar 1, that is to say the free end 3' of the arm 3 points toward the front of the motor cycle which is the most practical way of supporting pin 5 so that same has an angular relation to the surface on which the vehicle travels, which disposition of the pin 5 enables attainment of the object of the invention, namely, to tilt the wheel and at the same time to move same in a direction corresponding to the direction in which the front motor cycle wheel is moved, due to the fact that by said angular disposition of pin 5, the axle 7 which moves about said pin as an axis has its angular relationship to the surface upon which the motor cycle is traveling varied in accordance with the movement of the rocker arm, which latter moves correspondingly to the turning movement of the vehicle.

The inclined or angular disposition of the pin 5 relative to the roadbed, imparts an oblique position to the right or left, as the case may be to the wheel, in turning, and when movement is imparted to the rod 6 and rocker arm 4, a combined tilted and oblique movement is imparted to the wheel 8 governed by the direction that the front motor cycle wheel is given.

The different positions that the axle 7 assumes is shown in dotted and full lines in the drawings, in which it will be apparent that in turning a corner, the side car wheel automatically tilts and turns when movement is imparted to the rocker arm by the swaying of the motor cycle.

While the present invention is described particularly as being applicable to motor cycles, still it will be evident that same may be employed equally as well with automobiles or other vehicles and that the rocker arm may be actuated in any preferred or desired manner. Similarly in the drawings, the manner of supporting the pivot pin 5 is shown by way of example, it being immaterial how said pin is supported as long as the same is supported in tilted, inclined or angular relation to the surface or roadbed on which the vehicle travels, which disposition of the pin 5 is prerequisite to attain a combined canting and oblique disposition of the wheel, the oblique disposition corresponding to the turning of the front wheel or wheels of the vehicle.

What I claim is:

1. In combination with the frame of a vehicle, a bracket attached to a part of said frame and having an arm which inclines with respect to said frame part and at an incline to the surface or roadbed on which the vehicle travels, a rocker arm pivoted to the inclined arm upon a pivot that is inclined with respect to said surface, and an axle on the rocker arm disposed at right angles to the pivot of the rocker arm and having a wheel mounted thereon.

2. In a vehicle side car or the like having a wheel, means for tilting the side car wheel and simultaneously imparting an oblique movement to the wheel in the same direction as that in which the wheel of the motorcycle is turned.

3. In combination with the frame of a vehicle and a motorcycle, a wheel, means attached to the frame to incline forwardly with reference to the frame, a pivot carried by said means in angular relation with respect to the road bed, a bearing journaled upon the pivot for carrying the wheel, and means connected to the bearing and motorcycle to pivotally move the bearing thereby moving the wheel which is mounted thereon vertically and laterally simultaneously.

4. In combination with the side car wheel of a motorcycle or other vehicle, means to support said wheel so that the axis of rotation of the wheel may be moved to cause the wheel to cant and also simultaneously follow the direction of movement of the vehicle in turning.

5. In combination with the frame of a vehicle, a bracket attached to a part of said frame and having an arm which inclines with respect to said frame part and with respect to the surface or road-bed on which the vehicle travels, a rocker arm pivoted to the inclined arm upon a pivot that is inclined with respect to said surface, and an axle on the rocker arm disposed at right angles to the pivot of the rocker arm and having a wheel mounted thereon.

6. In combination with the frame of a vehicle, a bracket attached to a part of said frame and having an arm which inclines with respect to said frame part, and with respect to the surface or to the bed on which the vehicle travels, an arm pivoted to the inclined arm upon a pivot that is inclined with respect to said surface, and an axle on the pivoted arm disposed at right angles to the pivot of the pivoted arm and having a wheel mounted thereon.

7. In a vehicle side car, a wheel, a pivoted device which carries the wheel, and means to support said device so that the plane of pivot thereof is at an acute angle to the surface of the road bed on which the vehicle travels.

8. In combination with a motor cycle and a side car, a wheel, a device having an axle which carries the wheel pivoted to the side car so that the axle moves in a plane inclined to the vertical.

In testimony whereof I affix my signature in presence of two witnesses.

HUGO H. YOUNG.

Witnesses:
JOHN H. COSS,
LELA RITCHIE.

Copies of this patent may be obtained for five cents each, by addressing the "Commissioner of Patents, Washington, D. C."